(12) United States Patent
Sishtla

(10) Patent No.: US 9,976,565 B2
(45) Date of Patent: May 22, 2018

(54) COMPRESSOR SURGE DETECTION

(75) Inventor: Vishnu M. Sishtla, Manlius, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 660 days.

(21) Appl. No.: 13/819,505

(22) PCT Filed: Jun. 6, 2012

(86) PCT No.: PCT/US2012/040975
§ 371 (c)(1),
(2), (4) Date: Feb. 27, 2013

(87) PCT Pub. No.: WO2013/015885
PCT Pub. Date: Jan. 31, 2013

(65) Prior Publication Data
US 2013/0156544 A1     Jun. 20, 2013

Related U.S. Application Data

(60) Provisional application No. 61/503,196, filed on Jun. 30, 2011.

(51) Int. Cl.
*F04D 29/00* (2006.01)
*F04D 27/02* (2006.01)
(Continued)

(52) U.S. Cl.
CPC ........... *F04D 29/00* (2013.01); *F04D 27/001* (2013.01); *F04D 27/0261* (2013.01); *F04D 29/058* (2013.01)

(58) Field of Classification Search
CPC ............. F04D 27/0215; F04D 27/0207; F04D 27/0223; F04D 27/0246; F04D 27/0292; F04D 29/058; F04D 27/0261
See application file for complete search history.

(56) References Cited

U.S. PATENT DOCUMENTS 3,506,375 A * 4/1970 Endress ................ F04D 29/143
                                                      415/105
3,732,038 A   5/1973 Pilarczyk et al.
(Continued)

FOREIGN PATENT DOCUMENTS

CN     101368515 A    2/2009
GB       2298459 A    9/1996
(Continued)

OTHER PUBLICATIONS

International Search Report and Written Opinion for PCT/US2012/040975, dated Nov. 27, 2012.
(Continued)

*Primary Examiner* — Brandon Lee
(74) *Attorney, Agent, or Firm* — Bachman & LaPointe, P.C.

(57) ABSTRACT

A compressor (22) has a housing assembly (50) with a suction port (24) and a discharge port (26). A shaft (70) is mounted for rotation about an axis (500) and an impeller (44) is mounted to the shaft to be driven in at least a first condition so as to draw fluid in through the suction port and discharge the fluid from the discharge port. A magnetic bearing system (66, 67, 68) supports the shaft. A controller (84) is coupled to a sensor (80, 82) and configured to detect at least one of surge and pre-surge rotating stall and, responsive to said detection, take action to prevent or counter surge.

13 Claims, 3 Drawing Sheets

(51) Int. Cl.
*F04D 29/058* (2006.01)
*F04D 27/00* (2006.01)

(56) References Cited

U.S. PATENT DOCUMENTS

| | | | |
|---|---|---|---|
| 3,737,252 A | 6/1973 | Pilarczyk et al. | |
| 4,399,548 A | 8/1983 | Castleberry | |
| 4,420,947 A * | 12/1983 | Yoshino | F24D 11/0264 |
| | | | 126/585 |
| 4,503,684 A | 3/1985 | Mount et al. | |
| 5,924,847 A * | 7/1999 | Scaringe | F04D 25/06 |
| | | | 417/42 |
| 5,971,712 A | 10/1999 | Kann | |
| 6,036,432 A | 3/2000 | Sishtla et al. | |
| 6,213,724 B1 | 4/2001 | Haugen et al. | |
| 6,273,671 B1 * | 8/2001 | Ress, Jr. | F01D 5/043 |
| | | | 415/1 |
| 6,463,748 B1 | 10/2002 | Benedict et al. | |
| 6,581,399 B2 | 6/2003 | Benedict et al. | |
| 8,342,794 B2 * | 1/2013 | Staroselsky | F04D 27/001 |
| | | | 415/17 |
| 2003/0133814 A1 * | 7/2003 | Sishtla | F04D 29/057 |
| | | | 417/423.12 |
| 2007/0101755 A1 * | 5/2007 | Kikuchi | F04D 25/04 |
| | | | 62/402 |
| 2010/0206543 A1 * | 8/2010 | Tylisz | F01M 5/007 |
| | | | 165/297 |

FOREIGN PATENT DOCUMENTS

JP 63154806 A 6/1988
WO 2010/141815 A2 12/2010

OTHER PUBLICATIONS

Chinese Office Action for Chinese Patent Application No. 201280032475.8, dated Feb. 13, 2015.

* cited by examiner

COMPRESSOR SURGE DETECTION

CROSS-REFERENCE TO RELATED APPLICATION

Benefit is claimed of U.S. patent application Ser. No. 61/503,196, filed Jun. 30, 2011, and entitled "Compressor Surge Detection", the disclosure of which is incorporated by reference herein in its entirety as if set forth at length.

BACKGROUND

The disclosure relates to compressors. More particularly, the disclosure relates to electric motor-driven magnetic bearing compressors.

One particular use of electric motor-driven compressors is liquid chillers. An exemplary liquid chiller uses a hermetic centrifugal compressor. The exemplary unit comprises a standalone combination of the compressor, the cooler unit, the chiller unit, the expansion device, and various additional components.

Some compressors include a transmission intervening between the motor rotor and the impeller to drive the impeller at a faster speed than the motor. In other compressors, the impeller is directly driven by the rotor (e.g., they are on the same shaft).

Various bearing systems have been used to support compressor shafts. One particular class of compressors uses magnetic bearings (more specifically, electro-magnetic bearings). To provide radial support of a shaft, a pair of radial magnetic bearings may be used. Each of these may be backed up by a mechanical bearing (a so-called "touchdown" bearing). Additionally, one or more other magnetic bearings may be configured to resist loads that draw the shaft upstream (and, also, opposite loads). Upstream movement tightens the clearance between the impeller and its shroud and, thereby, risks damage. Opposite movement opens clearance and reduces efficiency.

Magnetic bearings use position sensors for adjusting the associated magnetic fields to maintain radial and axial positioning against the associated radial and axial static loads of a given operating condition and further control synchronous vibrations.

Centrifugal compressors have a limitation for operating at high head due to flow instability called "surge". The effect of surge is high vibrations and damage to the impeller and bearings. Hence, it is preferable to avoid surge in a compressor. At a given speed, a compressor has an associated maximum head limitation dictated by surge. For a compressor having inlet guide vanes for capacity control, at a constant suction pressure the discharge pressure at which surge occurs reduces with load. Surge may be triggered by something which increases saturation temperature at the condenser or decreases saturation temperature at the evaporator. For example, if condenser water temperature increases, surge may occur.

SUMMARY

Typically, surge is preceded by rotating stall. The typical frequency of rotating stall is less than 25 Hz (e.g., 20-25 Hz). Surge may follow at a slightly lower frequency (e.g., less than 20 Hz or 3-10 Hz). The particular configuration of the compressor, the nature of the refrigerant, and the operating conditions may influence the exact frequencies at which surge and rotating stall occur. Both surge and rotating stall cause subsynchronous shaft vibrations. By monitoring the frequency and the content of the vibration spectrum (e.g., from the output of existing sensors of the magnetic bearings), it is possible to detect rotating stall or surge. After detection, action may be taken to prevent onset of surge or counter (terminate) surge. Exemplary actions include one or both of increasing the compressor speed and opening a hot gas bypass valve.

Accordingly, one aspect of the disclosure involves a compressor having a housing assembly with a suction port and a discharge port. A shaft is mounted for rotation about an axis and an impeller is mounted to the shaft to be driven in at least a first condition so as to draw fluid in through the suction port and discharge the fluid from the discharge port. A magnetic bearing system supports the shaft. A controller is coupled to a sensor and configured to detect at least one of surge and pre-surge rotating stall and, responsive to said detection, take action to prevent or counter surge.

In various implementations, the housing may have a motor compartment and an electric motor may have a stator within the motor compartment and a rotor within the stator.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
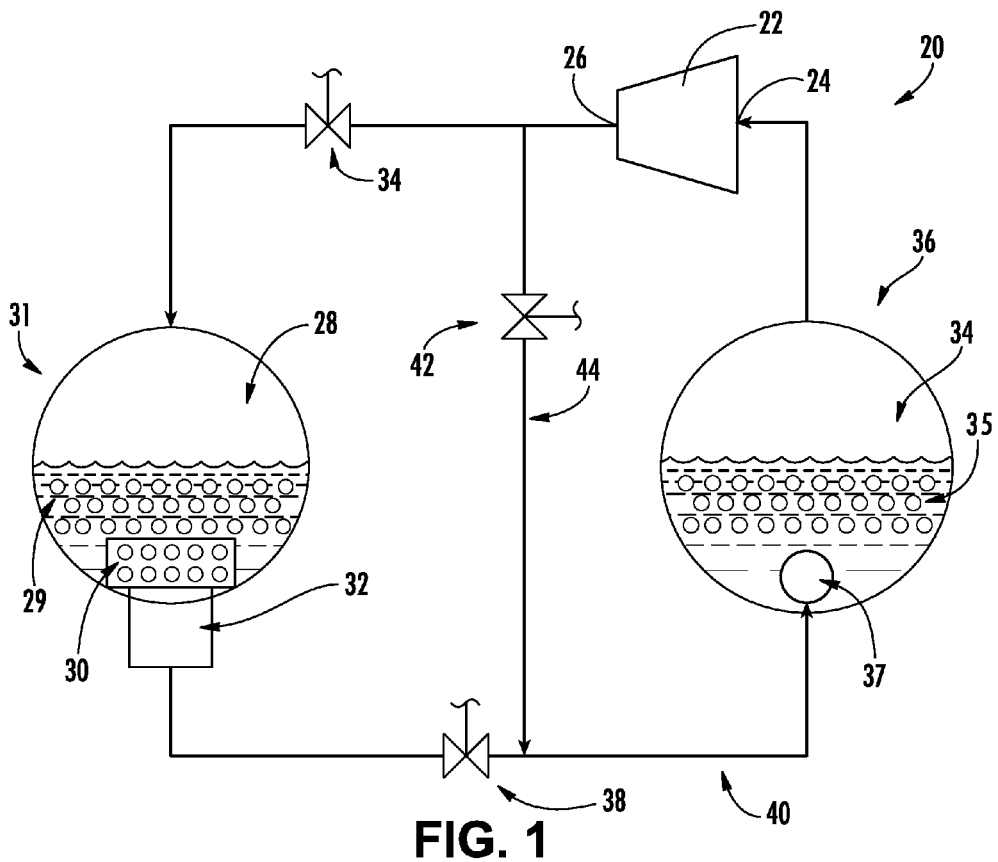
FIG. 1 is a partially schematic view of a chiller system.

FIG. 1 shows a vapor compression system 20. The exemplary vapor compression system 20 is a chiller system. The system 20 includes a contrifugal compressor 22 having a suction port (inlet) 24 and a discharge port (outlet) 26. The system further includes a first heat exchanger 28 in a normal operating mode being a heat rejection heat exchanger (e.g., a gas cooler or condenser). In an exemplary system based upon an existing chiller, the heat exchanger 28 is a refrigerant-water heat exchanger formed by tube bundles 29, 30 in a condenser unit 31 where the refrigerant is cooled by an external water flow. A float valve 32 controls flow through the condenser outlet from a subcooler chamber surrounding the subcooler bundle 30.

The system further includes a second heat exchanger 34 (in the normal mode a heat absorption heat exchanger or evaporator). In the exemplary system, the heat exchanger 34 is a refrigerant-water heat exchanger formed by a tube bundle 35 for chilling a chilled water flow within a chiller unit 36. The unit 36 includes a refrigerant distributor 37. An expansion device 38 is downstream of the compressor and upstream of the evaporator along the normal mode refrigerant flowpath 40 (the flowpath being partially surrounded by associated piping, etc.).

A hot gas bypass valve 42 is positioned along a bypass flowpath branch 44 extending between a first location downstream of the compressor outlet 26 and upstream of the isolation valve 34 and a second location upstream of the inlet of the cooler and downstream of the expansion device 38.

The compressor (FIG. 2) has a housing assembly (housing) 50. The exemplary housing assembly contains an electric motor 52 and one or more working impellers 54 drivable by the electric motor in the first mode to compress fluid (refrigerant) to draw fluid (refrigerant) in through the suction port 24, compress the fluid, and discharge the fluid from the discharge port 26. The exemplary impeller is directly driven by the motor (i.e., without an intervening transmission).

The housing defines a motor compartment 60 containing a stator 62 of the motor within the compartment. A rotor 64 of the motor is partially within the stator and is mounted for rotation about a rotor axis 500. The exemplary mounting is via one or more electromagnetic bearing systems 66, 67, 68 mounting a shaft 70 of the rotor to the housing assembly. The exemplary impeller 54 is mounted to the shaft (e.g., to an end portion 72) to rotate therewith as a unit about an axis 500.

Figure 2:
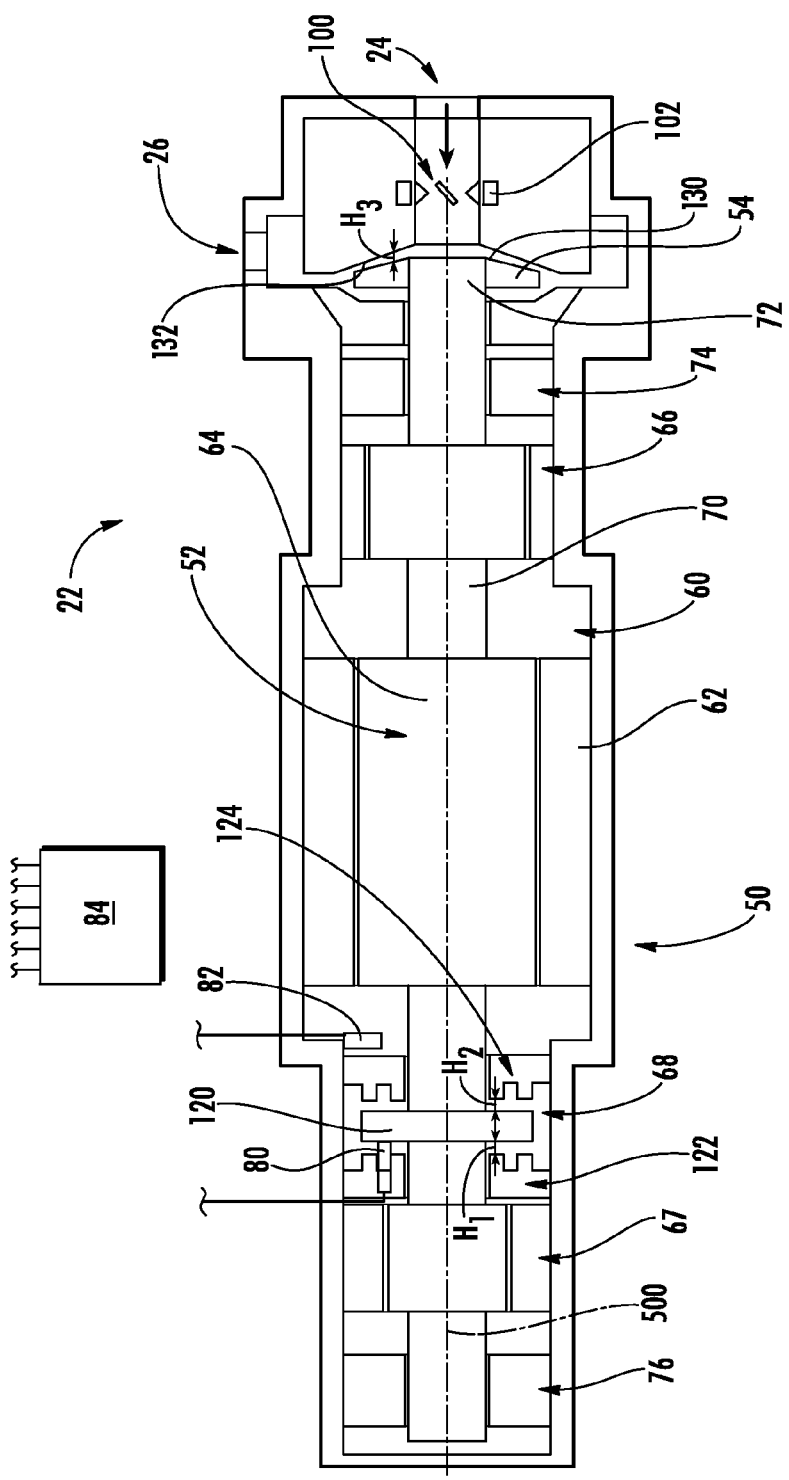
FIG. 2 is a schematized longitudinal sectional view of a compressor of the chiller system.

The exemplary bearing system 66 is a radial bearing and mounts an intermediate portion of the shaft (i.e., between the impeller and the motor) to the housing assembly. The exemplary bearing system 67 is also a radial bearing and mounts an opposite portion of the shaft to the housing assembly. The exemplary bearing 68 is a thrust/counterthrust bearing. The radial bearings radially retain the shaft while the thrust/counterthrust bearing has respective portions axially retaining the shaft against thrust and counterthrust displacement. FIG. 2 further shows an axial position sensor 80 and a radial position sensor 82. These may be coupled to a controller 84 which also controls the motor, the powering of the bearings, and other compressor and system component functions. The controller may receive user inputs from an input device (e.g., switches, keyboard, or the like) and additional sensors (not shown). The controller may be coupled to the controllable system components (e.g., valves, the bearings, the compressor motor, vane actuators, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

The assignment of thrust versus counterthrust directions is somewhat arbitrary. For purposes of description, the counterthrust bearing is identified as resisting the upstream movement of the impeller caused by its cooperation with the fluid. The thrust bearing resists opposite movement. The exemplary thrust/counterthrust bearing is an attractive bearing (working via magnetic attraction rather than magnetic repulsion). The bearing 68 has a thrust collar 120 rigidly mounted to the shaft 72. Mounted to the housing on opposite sides of the thrust collar are a counterthrust coil unit 122 and a thrust coil unit 124 whose electromagnetic forces act on the thrust collar. There are gaps of respective heights $H_1$ and $H_2$ between the coil units 122 and 124 and the thrust collar 120.

FIG. 2 further shows mechanical bearings 74 and 76 respectively serving as radial touchdown bearings so as to provide a mechanical backup to the magnetic radial bearings 66 and 67, respectively. The inner race has a shoulder that acts as an axial touchdown bearing.

As so far described, the system and compressor may be representative of any of numerous system and compressor configurations. The sensors 80 and 82 may be existing sensors used for control of the electromagnetic bearings. In an exemplary modification from a baseline such system and compressor, the control routines of the controller 84 may be augmented with an additional routine or module which uses the outputs of one or both of the sensors 80 and 82 to anticipate surge and control the compressor and/or system components to avoid or mitigate such surge. The hardware may otherwise be preserved relative to the baseline.

Figure 3:
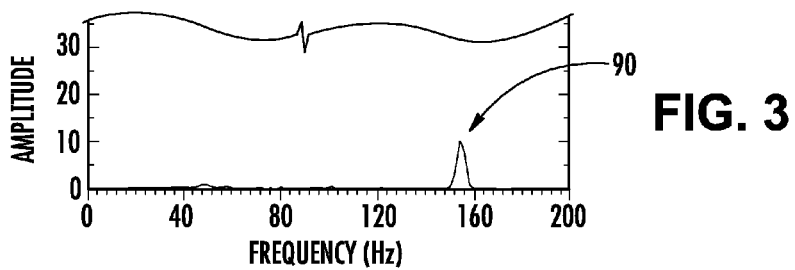
FIG. 3 is a vibration spectrum of a compressor in normal operation.
Figure 4:
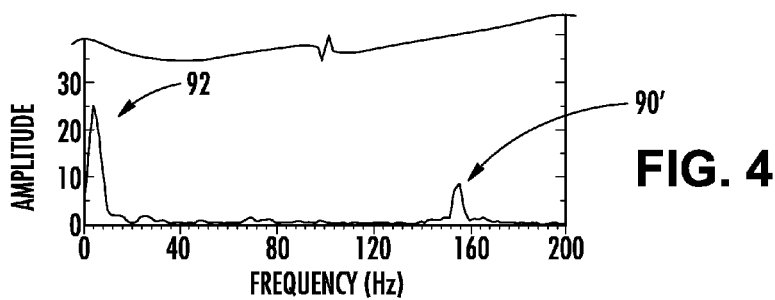
FIG. 4 is a vibration spectrum of the compressor during surge.

FIG. 3 shows the vibration spectrum of an exemplary compressor well prior to surge (i.e., before significant pre-surge stall). A single prominent peak 90 is at a frequency corresponding to shaft rotational speed (e.g., approximately 155 Hz in the example). FIG. 4 shows a vibration spectrum at surge. Across the spectrum, there is greater data fluctuation than in FIG. 3. However, the shaft speed peak is still present and is shown as 90'. However, there is another peak 92 at much lower frequency and of greater magnitude. The development of the peak 92 may be detected from the output of the sensors 80 and 82 (either directly or via filtering). An exemplary implementation discussed below uses the output of the radial position sensor 82.

If surge onset is determined, the controller may take either of several corrective actions. One control action involves controlling the orientation of the inlet guide vanes 100. The exemplary inlet guide vanes are arranged in a circumferential array in an inlet/suction passageway just downstream of the inlet 24. They may be rotated about respective axes via an actuator 102 so as to selectively constrict and free the inlet flow. Responsive to detected surge, the controller 84 may cause the actuator 102 to close the vanes by an incremental angle.

Yet alternatively, or additionally, speed may be controlled.

Yet alternatively, or additionally, the controller 84 may actuate the hot gas bypass valve 42 (FIG. 1).

Yet alternatively, or additionally, impeller clearance may be controlled.

Figure 5:
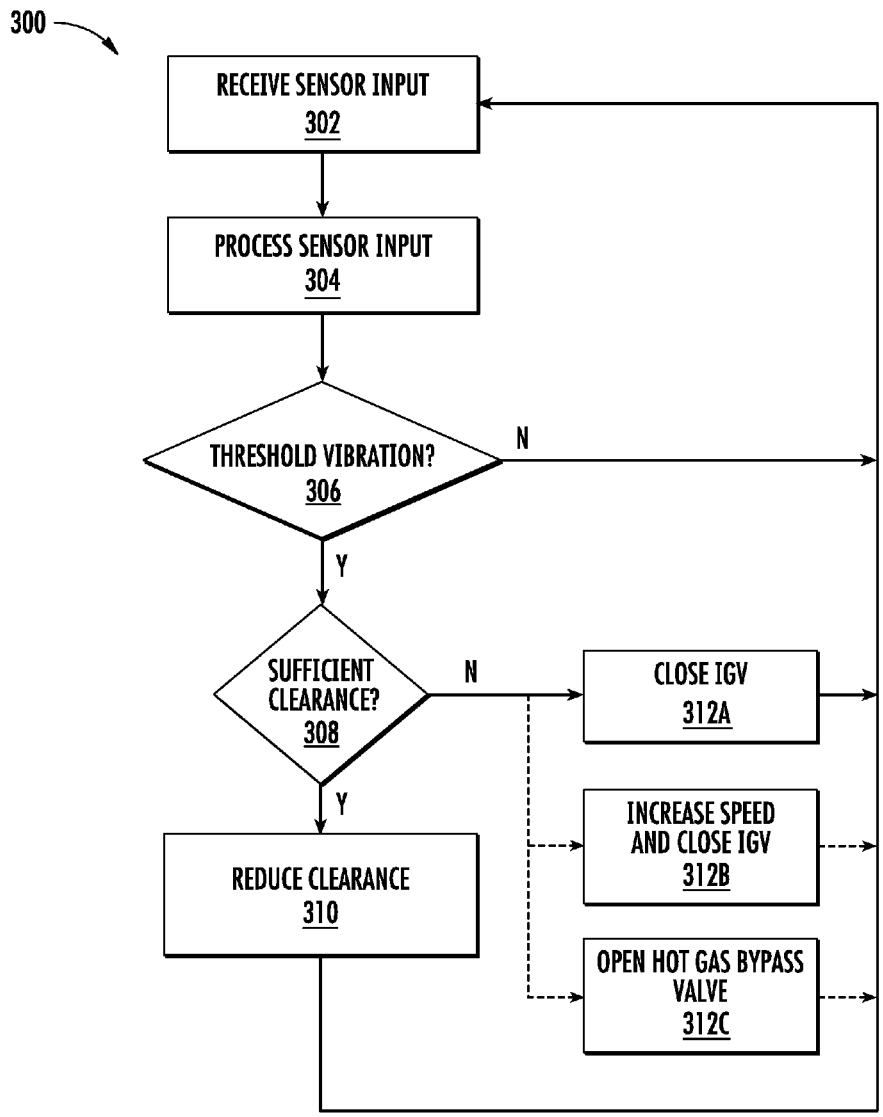
FIG. 5 is a control flowchart.

FIG. 5 is an exemplary control flowchart of a control process 300. This exemplary routine may be added to the existing control routine (e.g., of a baseline compressor). The process includes receiving position sensor input 302. The position sensor input (e.g., accumulated) is processed 304 to provide vibration data (e.g., amplitude and frequency information such as reflected in FIGS. 3 and 4). It is then determined 306 whether there is surge or impending surge (e.g., rotating stall). For example, this may be determined via the presence of more than a specified amplitude of vibration in a specified frequency range. An exemplary threshold amplitude is 0.002 inch (0.05 mm) (more broadly, greater than 0.001 inch (0.025 mm) or 0.0015-0.003 inch (0.04-0.08 mm) as a threshold value). An exemplary frequency is 3-10 Hz for surge. In this exemplary implementation, the frequency range may be such as to miss pre-surge rotating stall. Alternative implementations for detecting rotating stall may have a broader frequency range and a lower threshold amplitude (at least lower than the higher foregoing values). However, such detection may be somewhat more susceptible to false positives.

If no surge (or pre-surge stall) is detected, then no action is taken (e.g., the process may return to the starting point at 302). If surge is detected, an action may be taken or the appropriate one of several actions may be determined. For example, the exemplary flowchart identifies two different actions to be taken depending upon measured clearance $H_3$. It is determined 308 whether the measured clearance is greater than a minimum. The measured clearance may be reflected in the position sensor input which may be time averaged or otherwise processed.

In an exemplary controller configuration, the minimum clearance may be determined from a look-up table. This may be the case where a given nominal compressor model can be ordered with any of a plurality of different impellers having different blade heights. Each different impeller may have associated therewith a different minimum clearance. The controller may have a look-up table for all available impellers/blade heights and the identity of the particular impeller may be entered at manufacture. This may directly provide the lookup table and/or the lookup table may be fully or partially provided via performing a calibration during compressor assembly. If clearance (blades 130 to shroud 132) is greater than minimum, then the clearance may be reduced 310 via controlling the magnetic bearing. For example, the current applied to one side of the bearing (e.g., the counterthrust unit 122) may be reduced by an increment and the current applied to the other side (e.g., the thrust unit 124) of the bearing may be increased by an increment (e.g., the same increment). The increment may be proportional to the difference between the actual position sensor input voltage (either instantaneous or time average) and the position sensor input voltage associated (e.g., in the lookup table) with the minimum clearance. The proportionality constant (or other function) may be chosen to be large enough to be sufficiently responsive but to be small enough to not risk over correction. This may be done experimentally. Alternatively, a fixed reduction increment may be used. If, however, clearance has fallen to or below the minimum value, one or more of several alternative corrective actions 312A-312C may be taken. In a first alternative action 312A, the inlet guide vanes may be closed. Closure may be via a fixed increment or via a proportionality constant similar to that discussed at step 310. In a second alternative 312B, the IGV is similarly closed but speed is increased (increased via a fixed increment or via a function such as a proportionality function identified at step 310). In a third alternative, the hot gas bypass valve 42 may be opened 312C.

Although an embodiment is described above in detail, such description is not intended for limiting the scope of the present disclosure. It will be understood that various modifications may be made without departing from the spirit and scope of the disclosure. For example, when applied to the reengineering of an existing compressor or a compressor in an existing application, details of the existing compressor or application may influence details of any particular implementation. Accordingly, other embodiments are within the scope of the following claims.

What is claimed is:

1. A vapor compression system comprising:
a centrifugal compressor comprising:
    a housing assembly having a suction port and a discharge port;
    a shaft mounted for rotation about an axis;
    an impeller mounted to the shaft to be driven in at least a first condition so as to draw fluid in through the suction port and discharge said fluid out from the discharge port;
    a shroud with a clearance between the impeller and the shroud;
    a magnetic bearing system supporting the shaft, the magnetic bearing system comprising a first radial bearing, a second radial bearing, and a thrust bearing; and
    sensors comprising a radial position sensor and an axial position sensor;
a first heat exchanger coupled to the discharge port to receive refrigerant driven in a downstream direction in the first operational condition of the compressor;
an expansion device downstream of the first heat exchanger;
a second heat exchanger downstream of the expansion device and coupled to the suction port to return refrigerant in the first operating condition;
a hot gas bypass valve positioned to bypass the first heat exchanger and convey refrigerant from the compressor to the second heat exchanger; and
a controller coupled to the sensors and configured to:
    drive the motor to draw the fluid in through the suction port and discharge the fluid from the discharge port;
    detect pre-surge rotating stall responsive to sensed vibration input from the radial position sensor; and
    responsive to the detected rotating stall, take an action to prevent onset of surge,
    wherein the action comprises the controller adjusting a target value of the clearance between the impeller and the shroud via controlling the magnetic bearing system while the clearance exceeds a minimum value; and when the clearance does not exceed the minimum value, the action comprises the controller opening the hot gas bypass valve.

2. The vapor compression system of claim 1 wherein:
the housing comprises a motor compartment; and
an electric motor has a stator within the motor compartment and a rotor within the stator.

3. The vapor compression system of claim 1 wherein:
the thrust bearing is a thrust/counterthrust bearing.

4. The vapor compression system of claim 1 further comprising:
a counterthrust bearing axially spaced apart from the thrust bearing.

5. The vapor compression system of claim 1 wherein:
the controller is configured to detect said rotating stall via detecting vibration and, responsive to the detected rotating stall take action distinct from the control of synchronous vibration.

6. The vapor compression system of claim 1 wherein:
the controller is configured to detect said vibration from one or more bearing position sensors.

7. The vapor compression system of claim 1 wherein:
the controller is configured to detect said vibration in a frequency range of 3-10 Hz.

8. The vapor compression system of claim 1 wherein the controller is configured to detect said rotating stall by:
determining the presence of a vibration exceeding a threshold magnitude within a frequency range.

9. The vapor compression system of claim 1 wherein the controller is configured to take said action to prevent the onset of surge by
increasing the compressor speed.

10. The vapor compression system of claim 2 wherein:
the impeller is a single impeller mounted to the rotor by the shaft for direct coaxial rotation with the rotor.

11. The vapor compression system of claim 1 wherein:
the controller adjusts the target value of the clearance to:
    limit synchronous vibration responsive to sensed output of the radial position sensor.

12. The vapor compression system of claim 1 wherein:
the controller is configured to detect and limit said synchronous vibration responsive to input from said radial position sensor.

13. The vapor compression system of claim 1 wherein:
the impeller has an axial range of motion including extending from zero clearance through and beyond the minimum clearance.

\* \* \* \* \*